(12) United States Patent
Zhang (10) Patent No.: US 12,424,144 B2
(45) Date of Patent: Sep. 23, 2025

(54) SCREEN SYSTEM CONTROL METHOD AND SCREEN CONTROL SYSTEM

(71) Applicant: MediaTek Singapore Pte. Ltd., Singapore (SG)

(72) Inventor: Cui Zhang, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 216 days.

(21) Appl. No.: 18/237,398

(22) Filed: Aug. 23, 2023

(65) Prior Publication Data
US 2024/0420618 A1    Dec. 19, 2024

(30) Foreign Application Priority Data
Jun. 13, 2023    (CN) .......................... 202310700923.7

(51) Int. Cl.
*G09G 3/20* (2006.01)
*G06T 1/20* (2006.01)

(52) U.S. Cl.
CPC ............ *G09G 3/2096* (2013.01); *G06T 1/20* (2013.01); *G09G 2330/022* (2013.01); *G09G 2330/04* (2013.01); *G09G 2350/00* (2013.01); *G09G 2360/12* (2013.01)

(58) Field of Classification Search
CPC ........... G09G 3/2096; G09G 2330/022; G09G 2330/04; G09G 2350/00; G09G 2360/12; G06T 1/20
See application file for complete search history.

(56) References Cited

U.S. PATENT DOCUMENTS

| | | | | |
|---|---|---|---|---|
| 2008/0216015 A1* | 9/2008 | Lee | .................... | H04M 1/72427 |
| | | | | 715/810 |
| 2013/0124724 A1* | 5/2013 | Madgwick | .............. | H04L 43/12 |
| | | | | 709/224 |
| 2013/0339719 A1* | 12/2013 | Jang | ...................... | G06F 3/0488 |
| | | | | 713/100 |

\* cited by examiner

*Primary Examiner* — Xin Sheng
(74) *Attorney, Agent, or Firm* — Winston Hsu (57) ABSTRACT

A screen system control method, applied to a screen system comprising a screen, a host and at least one idle image generating module. The method comprises: (a) establishing software flow and error handling mechanisms to switch the screen system between working mode and idle mode; (b) establishing different mode switch mechanism for different screen types and application scenarios; (c) establishing hardware circuit of idle controller and the other display-related engines to automatically accomplish the mode switch operations between working mode and idle mode; and (d) establishing an overflow protection mechanism for write direct memory access (WDMA).

16 Claims, 10 Drawing Sheets

FIG. 1

Command Mode Screen

Video Mode Screen

Example 1

Example 2

Example 3

FIG. 10

SCREEN SYSTEM CONTROL METHOD AND SCREEN CONTROL SYSTEM

BACKGROUND

The present invention relates to a screen system control method and a screen control system, and particularly relates to a screen system control method and a screen control system which can reduce latency while switching between an idle mode and a working mode.

An electronic device with a screen may enter an idle mode when the user does not give any command to the electronic device for a short period of time. For example, if the user is using a laptop and then leaves his seat for a while, the laptop may enter the idle mode and the screen thereof may show the same contents until the laptop enters a sleep mode or the user gives a command to the laptop again. Similarly, if the user is browsing a web page and stop scrolling for a while, the mobile phone may enter the idle mode and the screen thereof may show the same contents until the mobile phone enters a sleep mode or the user plays the mobile phone again.

However, conventional steps for controlling the idle images may have UX latency of "milli second" or "second" level which may be detected by the end user, and the picture quality may be inconsistency especially when the electronic device frequently switches between the idle mode and the working mode.

Therefore, a new screen idle low power control mechanism is needed.

SUMMARY

One objective of the present invention is to provide a screen system control method which can select a proper screen idle switch procedure to minimize the UX delay and keep the picture quality consistent while switching between the idle mode and the working mode.

Another objective of the present invention is to provide a screen system which can select a proper screen idle switch procedure to minimize the UX delay and keep the picture quality consistent while switching between the idle mode and the working mode.

One embodiment of the present invention discloses: A screen system control method, applied to a screen system comprising a screen, a host coupled to the screen and at least one idle image generating module such as a WDMA, a GPU, or the other image processors if necessary. The screen control system method comprises: (a) establishing software flow and error handling mechanisms to switch the screen system between working mode and idle mode; (b) establishing different mode switch mechanism for different screen types and application scenarios; (c) establishing hardware circuit of idle controller and the other display-related engines to automatically accomplish the mode switch operations between working mode and idle mode; and (d) establishing an overflow protection mechanism for write direct memory access (WDMA).

Another embodiment of the present invention discloses: A screen system, comprising: a host; a screen, coupled to the host; an idle image generating module such as a WDMA, a GPU, or the other image processors if necessary; and a processing circuit, configured to perform following steps: (a) establishing software flow and error handling mechanisms to switch the screen system between working mode and idle mode; (b) establishing different mode switch mechanism for different screen types and application scenarios; (c) establishing hardware circuit of idle controller and the other display-related engines to automatically accomplish the mode switch operations between working mode and idle mode; and (d) establishing an overflow protection mechanism for write direct memory access (WDMA).

In view of above-mentioned embodiments, a proper procedure can be selected for screen idle switch. Besides, the idle image for the idle mode can be automatically generated by the same hardware engine of working mode, thus the delay issue and picture quality inconsistency issue while switching between the idle mode and the working mode can be improved.

These and other objectives of the present invention will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present application. The term "first", "second", "third" in following descriptions are only for the purpose of distinguishing different one elements, and do not mean the sequence of the elements. For example, a first device and a second device only mean these devices can have the same structure but are different devices.

Figure 1:
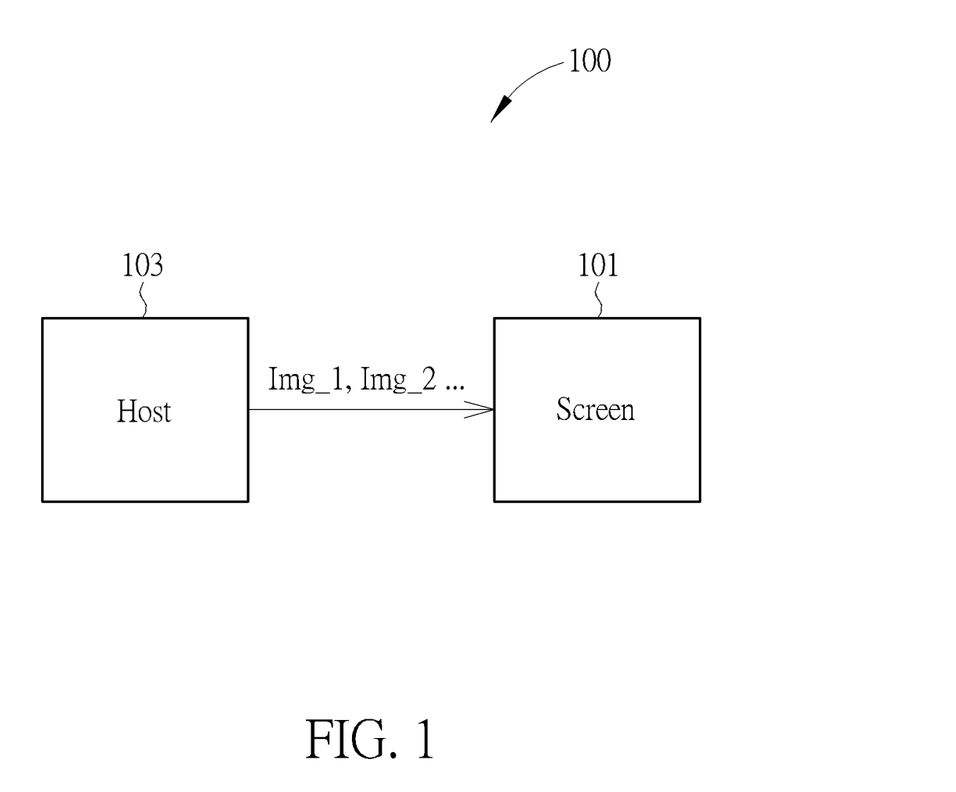
FIG. 1 is a schematic diagram illustrating that a screen is in a working mode and receives at least one normal image from the host.

FIG. 1 is a schematic diagram illustrating that a screen is in a working mode and receives at least one normal image from the host. As shown in FIG. 1, the screen system 100 comprises a screen 101 and a host 103. In a working mode, which may mean a user is using the screen system 100 such that the host 103 receives new images from an APP (application) or generates new images responding to instructions from the APP, the host 103 continuous providing normal images Img_1, Img_2 . . . (the new images) to the screen 101, and then the screen 101 correspondingly displays the normal images Img_1, Img_2 . . . . In one embodiment, different normal images have different contents. However, in another embodiment, different normal images have identical contents, depending on the operation of APP. The host 103 can be a device independent from the screen 101, for example, the host 103 is provided in a desktop computer which is connected to the screen 101. Alternatively, the host 103 can be provided in the same device with the screen 101, for example, the host 103 is provided in a mobile phone or a tablet computer which respectively contains the screen 101. Details of the screen 101 and the host 103 will be described in following descriptions.

Figure 2:
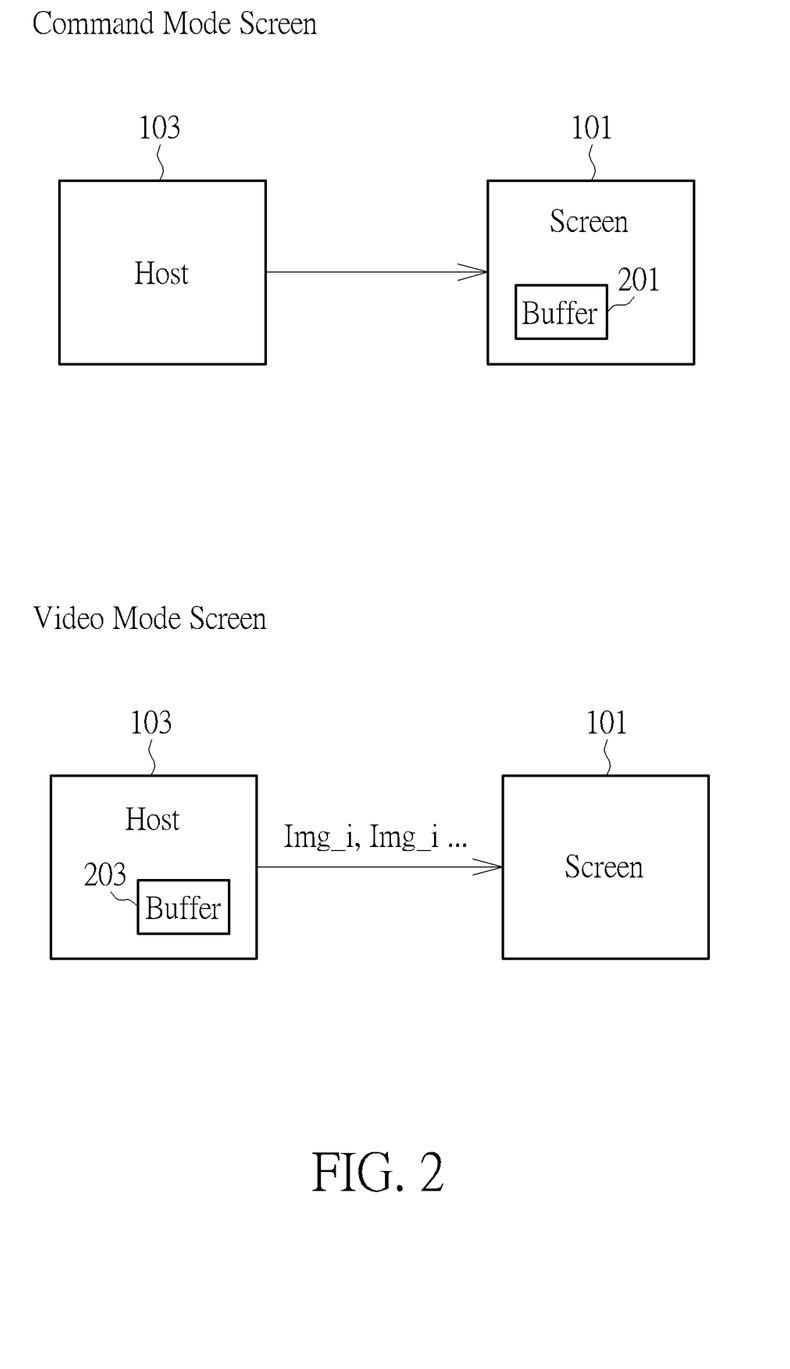
FIG. 2 is a schematic diagram illustrating that screens, which are different types of screens, are in an idle mode and receives at least one idle image from the host.

If the screen system 100 enters the idle mode, the screen 101 displays the idle image rather than the normal images in FIG. 1. However, for different types of screens, the host 103 or the screen 101 may have different operations. FIG. 2 is a schematic diagram illustrating that screens which are different types of screens are in an idle mode and receive at least one idle image from the host 103. In the upper diagram of FIG. 2, the screen 101 is a command mode screen (CMD screen herein after). Also, in the lower diagram of FIG. 2, the screen 101 is a video mode screen (VDO screen herein after).

The CMD screen has an image buffer 201 provided therein. Therefore, in the upper diagram of FIG. 2, the screen 101 receives an idle image Img_i and stores the idle image Img_i in the image buffer 201. The idle image Img_i can be a last image of the normal images received in the working mode. After that, the screen 101 displays the idle image Img_i when it operates in the idle mode. In one embodiment of the CMD screen, the host 103 can be power off and does not provide any image to the screen 101 in the idle mode, until the screen system 100 leaves the idle mode. The image buffer 201 can also be used to buffer images which are not idle images.

On the contrary, the VDO screen does not comprise the image buffer 201. Accordingly, in the lower diagram of FIG. 2, the host 103 repeatedly provides the idle image Img_i to the screen 101 in the idle mode. Thus, the screen 101 displays the idle images Img_i when it operates in the idle mode. In one embodiment, the host 103 repeatedly provides the idle image Img_i to the screen 101 at a frequency lower than the frame refresh rate of working mode. For the VDO screen, the host 103 may use a buffer 203 therein to buffer the idle image Img_i before output the idle image Img_i.

Figure 3:
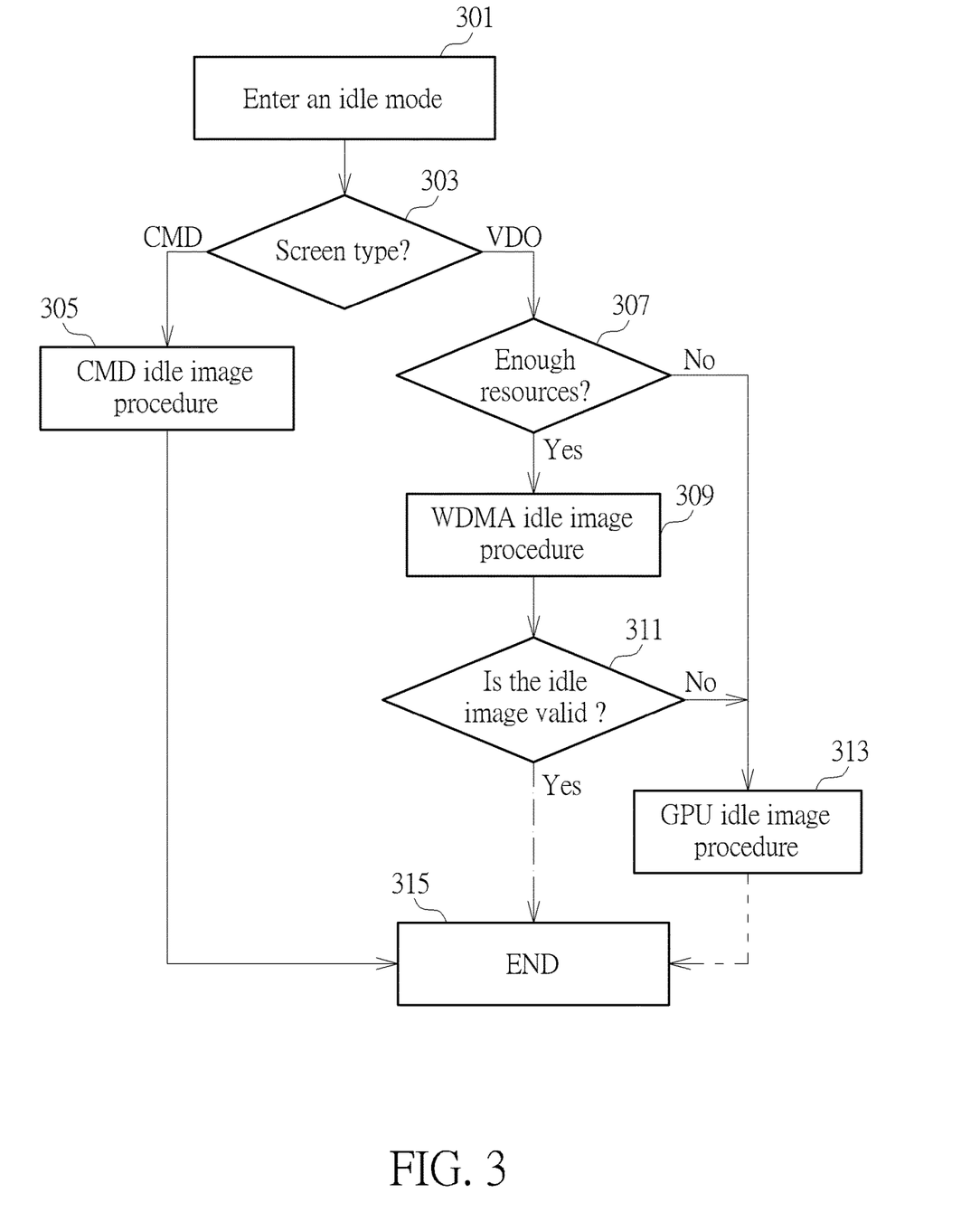
FIG. 3 is a software (SW) flow chart illustrating operations for entering idle mode of the screen system according to one embodiment of the present invention.

FIG. 3 is a flow chart illustrating a screen system control method according to one embodiment of the present invention. In one embodiment, the steps illustrated in FIG. 3 can be controlled by a processing circuit (e.g., a processor), which can be provided at any location corresponding to different requirements. For example, in one embodiment, the processing circuit is provided in the host 103, but not limited. In one embodiment, only the steps 305 and 309 are controlled by the processor, but the steps 301, 303, 307, 311, 313 and 315 are controlled by software. Additionally, the steps in FIG. 3 can be removed corresponding to different requirements.

The steps in FIG. 3 comprise:

Step 301

Control the screen system 100 to start to enter an idle mode. In other words, start switching the screen system from a working mode to an idle mode according to the scene and screen information.

Please note, in the step 301, the screen system 100 does not enter the idle mode yet. Different examples of the step 301 will be described later.

Step 303

Determine the way of switching according to the screen information, such as the screen type information of the screen.

If the screen 101 is a CMD screen, go to step 305.
If the screen 101 is a VDO screen, go to step 307.

Step 305

Perform a CMD idle image procedure, which is shown in the upper diagram of FIG. 2.

In one embodiment, the step 305 is performed by a screen control system. The screen control system comprises an idle control circuit and a plurality of hardware components. The step 305 is automatically completed by the hardware components after the idle control circuit receives the idle request. Details of the screen control system will be described later.

If the screen 101 is a VDO screen, the idle images may be selectively generated by a WDMA idle image procedure or a GPU idle image procedure. The WDMA idle image procedure is described in the step 309 and the GPU idle image procedure is described in the step 313. GPU and WDMA are more commonly used in mobile phones. However, some kind of hosts 103 have neither the WDMA nor the GPU. In such case, the idle image may be generated by a CPU or a micro core.

Step 307

The host 103 may have a memory system which may comprises a memory device (e.g., a DRAM) and bus architectures. In such case, the step 307 runtime checks if the memory system in the host has enough resources to support a WDMA (write direct memory access) in the screen system to output the idle image. For example, the step 307 runtime checks if the current bandwidth resource of memory system is available to support the hardware real time requirement of WDMA output. If yes, we may adjust the voltage of memory device or clock frequency of memory bus before WDMA output (reference to step 4 in FIG. 7). Else, SOFTWARE should give up the WDMA output solution, and choose the software real time solution of GPU repaint.

If the answer in the step 307 is yes, then go to step 309 to perform the WDMA idle image procedure. On the contrary, if the answer in the step 307 is no, then go to step 313 to perform the GPU idle image procedure.

Step 309

Perform the WDMA idle image procedure. In other words, apply the WDMA to output the idle image to the above-mentioned memory device in the host 103 if the memory bus system has enough bandwidth resources to support the hardware real time requirement of WDMA output. The memory bus system is a bus system coupled to the memory device.

Details of the WDMA idle image procedure will be described in FIG. 4. In one embodiment, the step 309 is performed by a screen control system. The screen control system comprises an idle control circuit and a plurality of hardware components. The step 309 is automatically completed by the hardware components after the idle control circuit receives the idle request.

Step 311

In one embodiment, the host 103 further comprises a transmitting interface for outputting images to the screen 101. For example, the WDMA outputs an idle image to the memory device stated in the step 309, and such idle image will be transferred to the screen 101 in the idle mode.

In such case, the step 311 determines if the WDMA successfully outputs the idle image after the step 303 and 307 decides to apply the WDMA output the idle image. If the WDMA does not successfully outputs the idle image, it means the idle image output by WDMA is failed (i.e., invalid), thus abandon the idle image generated by WDMA and uses the GPU idle image procedure to generate the idle image again. If the WDMA successfully outputs the idle image, it means the idle image output by WDMA is valid, thus use the idle image generated by WDMA and do not switch to the GPU idle image procedure. Various methods can be used to determine if the WDMA successfully outputs the idle image. For example, IRQ event can be used by the hardware process unit to notify SOFTWARE that if the WDMA successfully outputs the idle image.

For low power consumption, the WDMA output function should be disabled immediately after step 309, no matter the idle image is successfully generated in step 311 or not.

Step 313

Perform the GPU idle image procedure. In other words, submit a GPU repaint request to generate the idle image if the memory system does not have enough resources to support the WDMA or the idle image generated by WDMA is invalid. Details of the GPU idle image procedure will be described in FIG. 5.

Step 315

End. At this time, the screen system has been idle mode now.

Additionally, some steps in FIG. 3 can be removed corresponding to different requirements. For example, the step 309 or the step 313 can be selected via different mechanisms, rather than the step 307 or the step 311.

Figure 4:
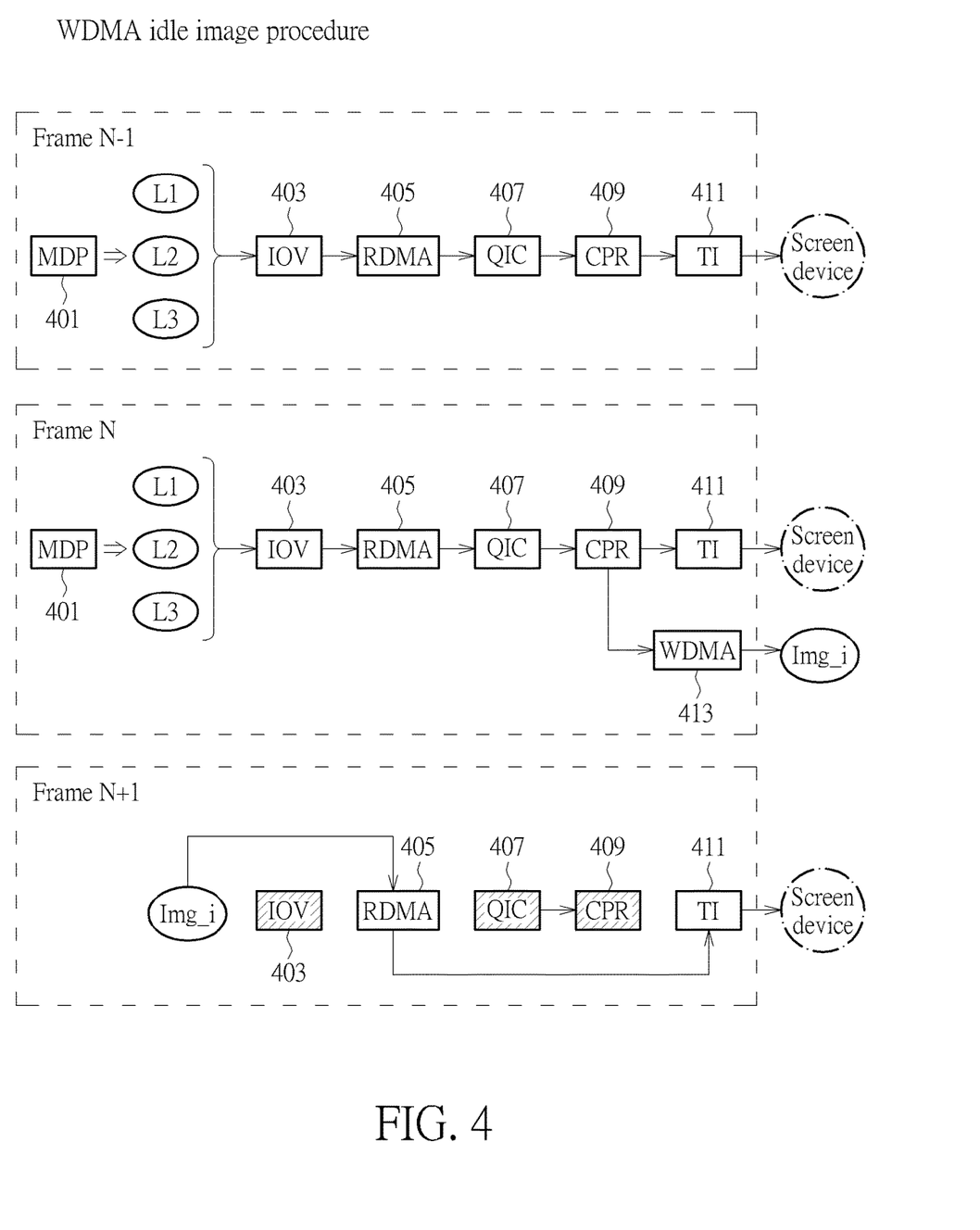
FIG. 4 is a schematic diagram illustrating the procedure of enter idle mode by WDMA.

FIG. 4 is a schematic diagram illustrating the procedure of a VDO screen enter idle mode by WDMA. As shown in FIG. 4, the above-mentioned electronic devices of the host 103 comprise: an image overlapping circuit 403, a RDMA (Read Direct Memory Access) 405, an image quality improving circuit 407, a compressor 409, and a transmitting interface 411. Please note the electronic devices shown in FIG. 4 and FIG. 5 can be removed or combined to less electronic devices. Further, the electronic devices can be named in different ways. The host 103 comprises a mobile display processor (MDP) 401. Please note, in the embodiments of FIG. 4 and FIG. 5, the screen 101 and the host 103 can have other electronic devices such as a resizer, corresponding to different designs. Alternatively, at least one of the electronic devices of the host 103 in FIG. 4 and FIG. 5 can be removed corresponding to different requirements. Further, the electronic devices illustrated in FIG. 4 and FIG. 5 can also be integrated to less electronic devices. For example, the RDMA 405, the image quality improving circuit 407 and the compressor 409 can be removed. Additionally, the image overlapping circuit 403 and the transmitting interface 411 can be replaced by other modules with similar functions.

In the working mode, different layers L1, L2, L3 of an input image are generated. In one embodiment, the layer L2 is generated by the MDP 401. Also, the layers L1, L3 can be generated by the GPU or a CPU in the host 103. Please note, in the embodiment of FIG. 4, the layer L2 of the normal image and the idle image Img_i are both generated by the same HW sequence of "MDP→IOV→RDMA→QIC→CPR", thus the normal image and the idle image Img_i are the same or have very few differences, such that no flicker is generated while switching from the working mode to the idle mode.

The image overlapping circuit 403 is configured to overlap different layers L1, L2, L3 of the input image to generate output stream data. The input image can be the above-mentioned new image. The RDMA 405 is configured to read the stream data from the image overlapping circuit 403. The image quality improving circuit 407 is configured to improve the quality of the output stream data from the RDMA 405. The compressor 409 is configured to compress the output stream data from the image quality improving circuit 407. The transmitting interface 411 is finally configured to deliver the stream data to screen 101 for image update. Please note, the transmitting interface 411 may be the transmitting interface illustrated in the steps 305, 311, 313.

FIG. 4 is a schematic diagram illustrating the procedure of VDO screen enter idle mode by WDMA. During the time that the frame N−1 comprising the layer L2 generated by the MDP 401 is displayed, the system 100 operates in a working mode but receives an idle request. Therefore, during the time that the frame N comprising the layer L2 generated by the MDP 401 is displayed, the WDMA 413 outputs the frame N to the memory device illustrated in the step 309 as the idle image Img_i. At this moment, the screen 101 also displays the frame N, but the host 103 is preparing to enter the idle mode.

Next, during the period of frame N+1, the idle image Img_i is read from the memory device of the host 103 and displayed. At this moment, the screen 101 displays the idle image Img_i, and the image overlapping circuit 403, the image quality improving circuit 407, the compressor 409 are non-active. While the RDMA 405 and the transmitting interface 411 are active. During the time of frame N−1 and the frame N, the host 103 uses direct link path. During the time of frame N+1, the host 103 uses decoupled path.

Figure 5:
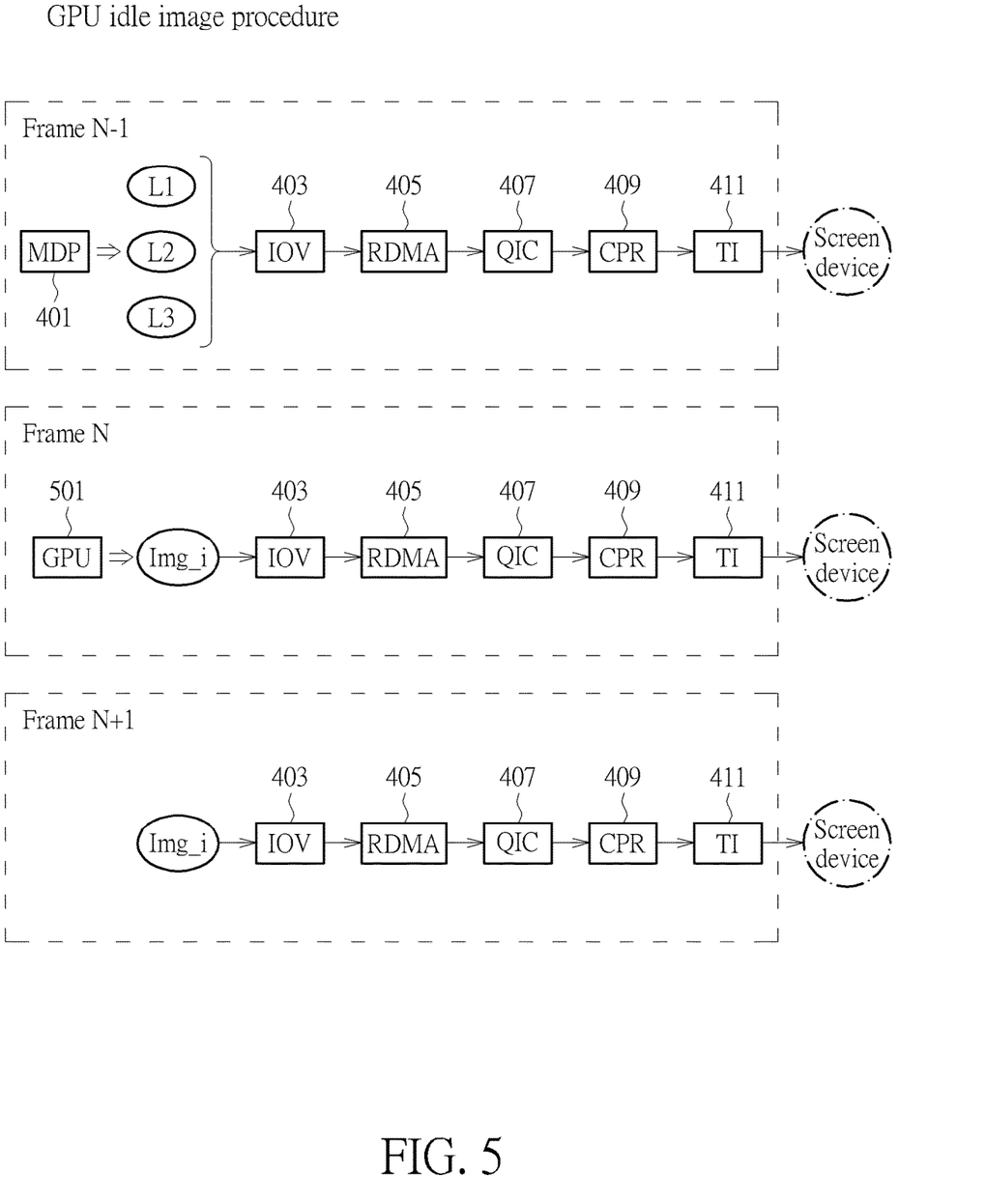
FIG. 5 is a schematic diagram illustrating the procedure of enter idle mode by GPU.

FIG. 5 is a schematic diagram illustrating the procedure of VDO screen enter idle mode by GPU. As shown in FIG. 5, during the time that the frame N−1 comprising the layer L2 generated by the MDP 401 is displayed, the system 100 displays the normal image but receives an idle request. Then, during time of the frame N, the software of the host 103 requests the GPU 501 to repaint an idle image Img_i. The GPU 501 is provided in the host 103. Please note, the Img_i generated by GPU is already a complete overlapped result of the input layers of L1, L2 and L3, thereof Img_i is no need to be overlapped by the image overlapping circuit 403. Next, the Img_i is read from the memory device and displayed. At this time, the idle image of frame N and the working image of frame N−1 are generated by different HW paths, then, screen flicker issue may be happened when screen system frequently switched between working and idle mode. In one embodiment, in the GPU idle image procedure, the host 103 keeps direct link path unchanged which takes more power consumption than the WDMA idle image procedure.

In view of above-mentioned descriptions, an idle image generating module can be acquired, which may comprise but not limited at least one of: CPU, MDP, WDMA and GPU. The idle image generating module may further comprise other components such as other micro cores or any other hardware design.

Please refer back to the step 301 again, in one embodiment, an idle request is generated to control the screen system to start to enter an idle mode. The idle request can be generated, for example, when no new image is generated by the above-mentioned APP, or no instruction for frame update is received by the host 103. For example, the user is viewing a web page but stop scrolling the web page. In such case, if the screen is a CMD screen, the screen system 100 is controlled to immediately enter the idle mode after last frame update done, without monitoring if any more frame update request in a predetermined time period. For more detail, via automatically power on and restoring settings by hardware process unit, the necessary time of CMD screen switch between idle mode and working mode is largely reduced which can be ignored by user experience, especially when the frame refresh rate is low.

In another embodiment, if the screen is a VDO screen and uses the WDMA idle image procedure, a tendency of entering idle mode is controlled according to the input layer number, the frame refresh rate, and the APP frame update cycle of current scenario, while the screen system receiving the idle request. If there are a plurality of input layers of high frame refresh rate, (ex: the scenario of scanning news), which already occupied a large bandwidth resource that caused bandwidth resource constraints of memory system, such that the WDMA output function is recommended to be enabled only at the idle switch frame (reference to the frame N of FIG. 4), and immediately disabled after Img_i is generated at frame N+1 of FIG. 4. On the contrary, if there are a few input layers of low frame refresh rate, and the frame update request is periodically arrived in a short cycle at current scenario (ex: the scenario of full screen video playback), which occupied a little bandwidth resource and the available bandwidth resource of memory system is enough, thus the WDMA output function is recommended to be enabled all the time to enhance the idle switch speed of VDO screen. In other words, SOFTWARE can runtime decided a proper idle switch procedure for the screen system 100 according to the real condition of current scenario.

For more detail, if current scenario comprised a plurality of input layers of high fame refresh rate, which has occupied most of the available bandwidth resource, then memory system has to increase the bandwidth ability to support the WDMA output function, such as hardware adjustment of increasing the frequency levels of memory bus, frequency levels of the memory device, or voltage levels of them. In order to meet such requirements, the operation of entering idle mode may consume more resources. For example, the voltage needs to be increased, thus the necessary power consumption of entering idle mode increases. In such case, the period for entering idle procedure is preferably longer, rather than the power consumption of entering idle procedure is wasted.

In contrast, if current scenario comprised a few input layers of low fame refresh rate, and current available bandwidth resource of memory system is enough for WDMA output function without adjustment by hardware. In such case, the necessary power consumption of VDO screen entering idle mode is considered of under control. Accordingly, the screen system 100 can enter the idle mode immediately after the idle image is generated without monitoring if any new image is updated to the screen 101 in a predetermined time period, especially if the frame rate is low.

The APP frame update cycle should also be considered when decided a best idle procedure of current scenario at step 301 of FIG. 3. For example, the scenario of scanning news or reading messages, the APP frame update cycle is long and unpredictable, so WDMA output function is recommended to be disabled immediately after entering idle mode for low power saving. To avoid of frequently short idle switch without low power gain, the monitor of any new frame updated in a predetermined time period is necessary before starting WDMA idle procedure.

Oppositely, the APP frame update cycle is short and periodicity at the scenario of full screen video playback, which caused that the screen system 100 is hard to enter idle mode if we still take a predetermined period to monitor new frame request. At the same time, the video playback scenario has only 1 layer with full screen show, so we can always enable WDMA output without adjustment of bandwidth ability, then screen system 100 can enter idle mode immediately after last frame update done, and gain the low power benefit by taking a max idle period. Further, in one embodiment, the scenario of idle image comprises camera preview, which has many layers and short idle time. In such case, the screen system may skip the idle mode and keep staying in the working mode. Accordingly, different scenarios may have different opportunities or different idle periods, so we have to set up a runtime decided methodology of entering idle mode.

Figure 6:
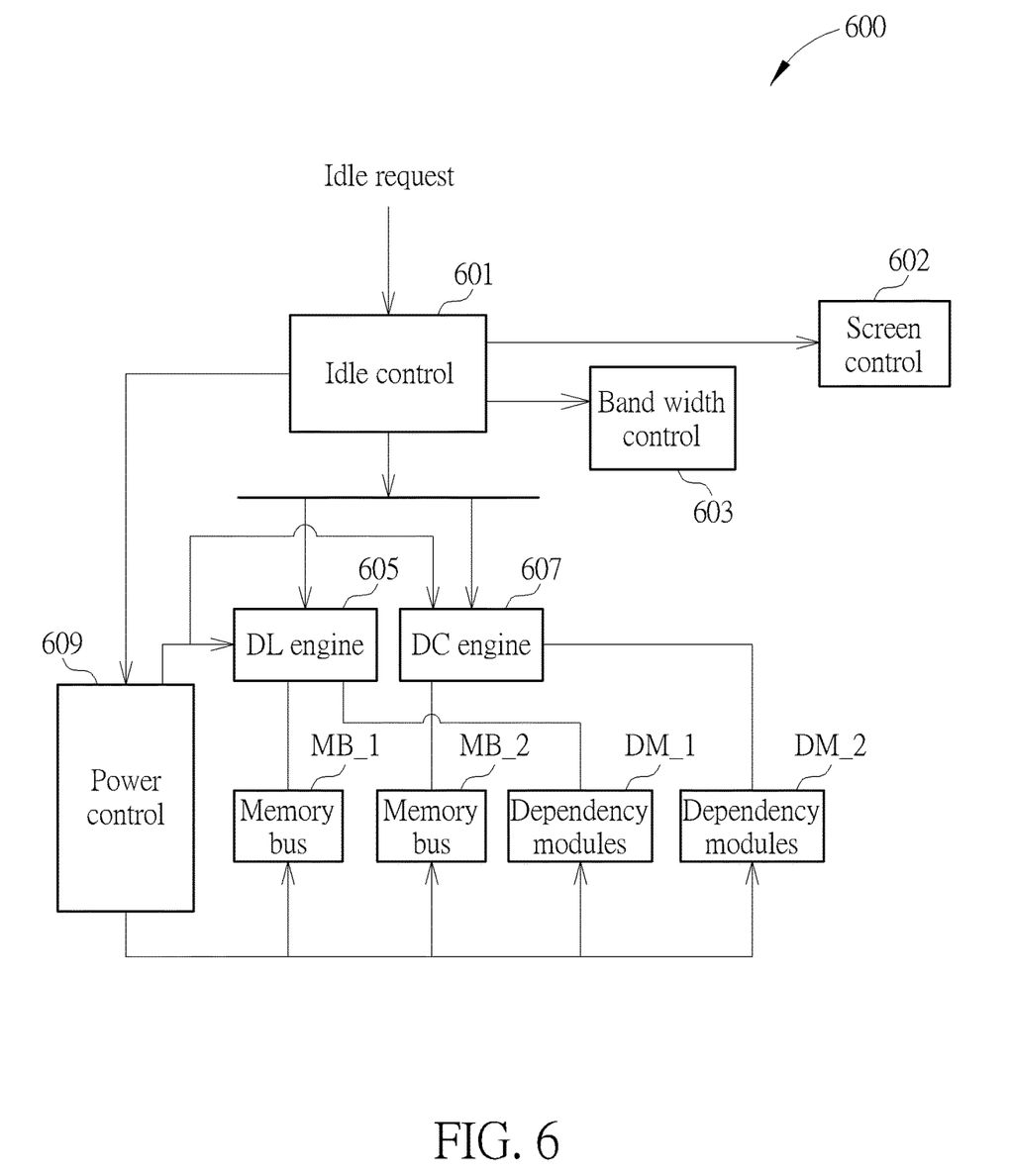
FIG. 6 is a hardware (HW) block diagram illustrating a screen control system according to one embodiment of the present invention.

As above-mentioned, in one embodiment, a screen control system comprises an idle control circuit and a plurality of hardware components. Also, the step 305 or 309 can be automatically completed by the hardware components after the idle control circuit receives the idle request. FIG. 6 is a block diagram illustrating a screen control system 600 according to one embodiment of the present invention. As shown in FIG. 6, the screen control system 600 comprises an idle control circuit 601 and a plurality of hardware components. In one embodiment, the idle control circuit 601 and the hardware components are provided in the host 103. However, the locations of all components of the screen control system 600 can be designed corresponding to different requirements. Further, the idle control circuit 601 and the hardware components can be implemented by various kinds of hardware such as circuits or logic gates. Additionally, in one embodiment, the idle control circuit 601 is integrated to the above-mentioned processing circuit, which performs the steps 305 and 309 of FIG. 3.

In the embodiment of FIG. 6, the hardware components comprise: a bandwidth control circuit 603, a set of direct link engines 605, a set of decouple engines 607, a power control circuit 609, a screen control circuit 602, at least one memory bus connection path (two memory bus connection paths MB_1, MB_2 are shown for explaining), and some dependency modules if necessary (two dependency modules DM_1, DM_2 are shown as an example for explaining).

The idle control circuit 601 can be regarded as a main controller of the screen control system 600, and is configured to manage other hardware components corresponding to a received idle request. In one embodiment, the idle control circuit 601 is further coupled to a screen control circuit 602, which can control the power state or transmission mode of the screen 101. However, the screen control circuit 602 can be removed from the embodiments of the present invention, since the screen 101 may not support power state change when image transmission has been stopped in idle period, or the screen system 100 doesn't need of lower frame refresh rate when enters the idle mode.

The bandwidth control circuit 603, which is coupled to the idle control circuit 601, is configured to send bandwidth request or directly adjust the hardware settings of bandwidth ability of the above-mentioned memory system in the host. In some embodiments, the bandwidth control circuit 603 can be removed. For example, if the bandwidth settings of memory system do not change in the working mode and the idle mode, the bandwidth control circuit 603 is not needed. In one embodiment, the bandwidth control circuit 603 can back up the working bandwidth settings and update the idle bandwidth settings when enter idle mode, and restore it when leave idle mode, if the bandwidth control is required by host 103.

The set of direct link engines 605 are the electronic devices of the host 103 which are optional (can be in-active status) in the memory decouple path when video panel enter idle mode. For example, the direct link engines 605 comprise the image overlapping circuit 403, the image quality improving circuit 407, and the compressor 409 illustrated in FIG. 4.

The set of decouple engines 607 means electronic devices of the host 103 which are mandatory in the memory decouple path when video panel enter idle mode (e.g., the RDMA 405 and the transmitting interface 411 in FIG. 4).

The power control circuit 609, which is coupled to the idle control circuit 601, is used to do power control and register backup/restore of all the other HW engines in host 103, including the set of direct link engines 605, and decouple engines 607. The memory bus connection paths MB_1, MB_2, which are coupled to the set of direct link engines 605 and the set of decouple engines 607, are used to support the data transfer between memory system and the set of direct link engines 605 or decouple engines 607. The dependency modules DM_1, DM_2, which are used to assist the SW/HW requests from the set of direct link engines 605 and decouple engines 607.

The power control circuit 609 can further control the power of the memory buses MB_1, MB_2 and the dependency modules DM_1, DM_2. For more detail, the power control circuit 609 further backup and restore the HW settings of the memory buses MB_1, MB_2 and the dependency modules DM_1, DM_2. Also, the power control circuit 609 reports the operation results of electronic devices to the idle control circuit 601.

Please refer back to the step 311 in FIG. 3. Idle control circuit 601 has adjusted the bandwidth ability before start WDMA output function, but the real condition of memory system is complexed with many other memory users and cannot promise a stable bandwidth resource all the time. Once WDMA output slowly with an instable bandwidth resource of memory system, which blocked the data stream from compressor 409 to transmitting interface 411 in frame N of FIG. 4, then end user will read a mess picture on screen 101. Based on the innovation of this patent, a protection mechanism will take effect at this critical situation of WDMA output slowly, which will make WDMA output an overflow idle image in memory device, instead of displaying a mess picture on screen 101. Further, the software can set the maximum number of errors allowed for the WDMA output. In other words, when the number of errors specified by the software is not exceeded, the idle control circuit can continue to try to use the WDMA to output a correct idle image until the number of WDMA failed times reaches the maximum number of errors allowed by the software, the idle control circuit stops entering idle mode and returns the operation result to the software. Above mechanism makes a safe protection for WDMA idle procedure, and largely de-risk the side effect of WDMA output function.

Figure 7:
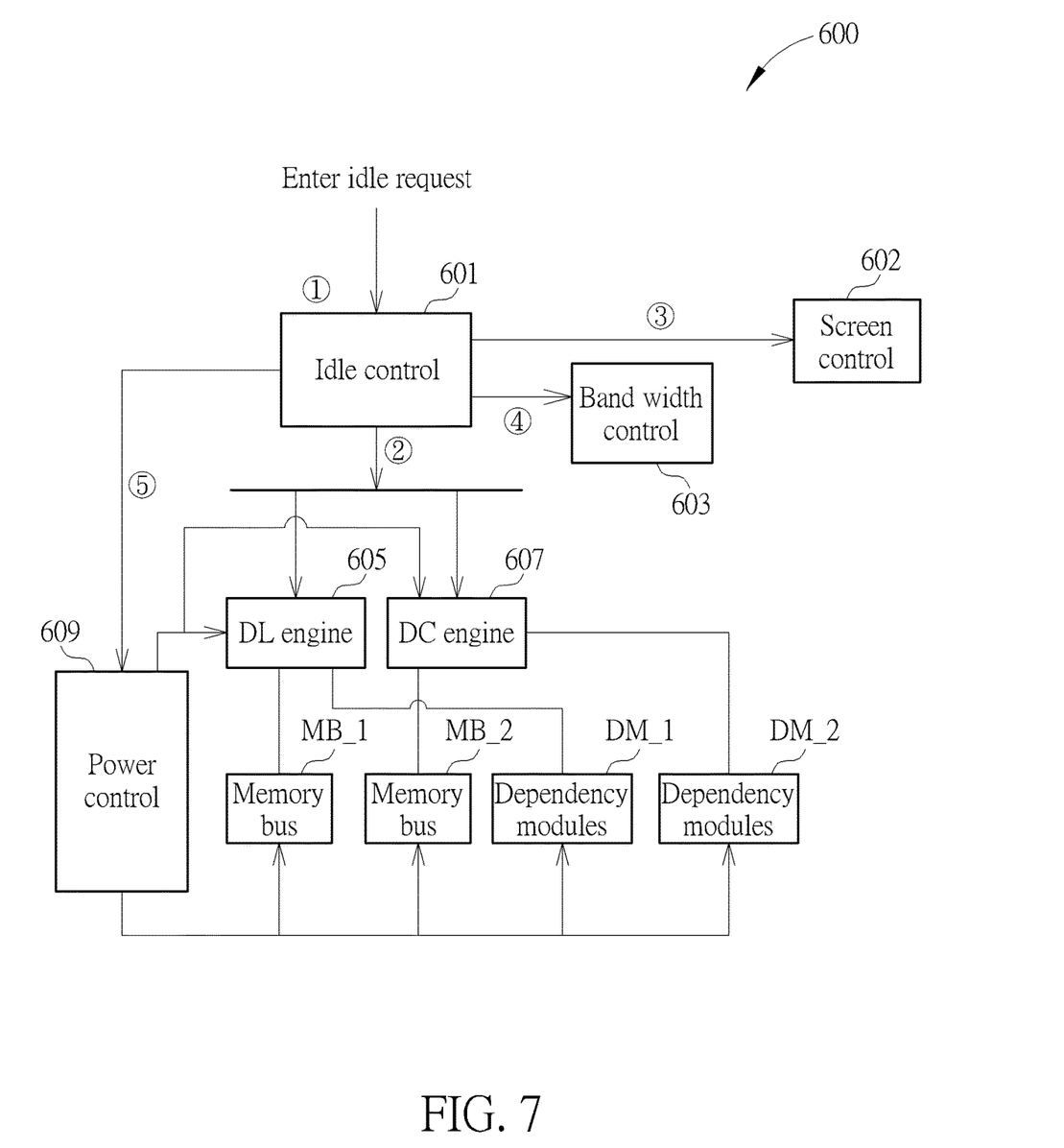
FIG. 7 is a block diagram illustrating the HW control procedure of entering idle mode.
Figure 9:
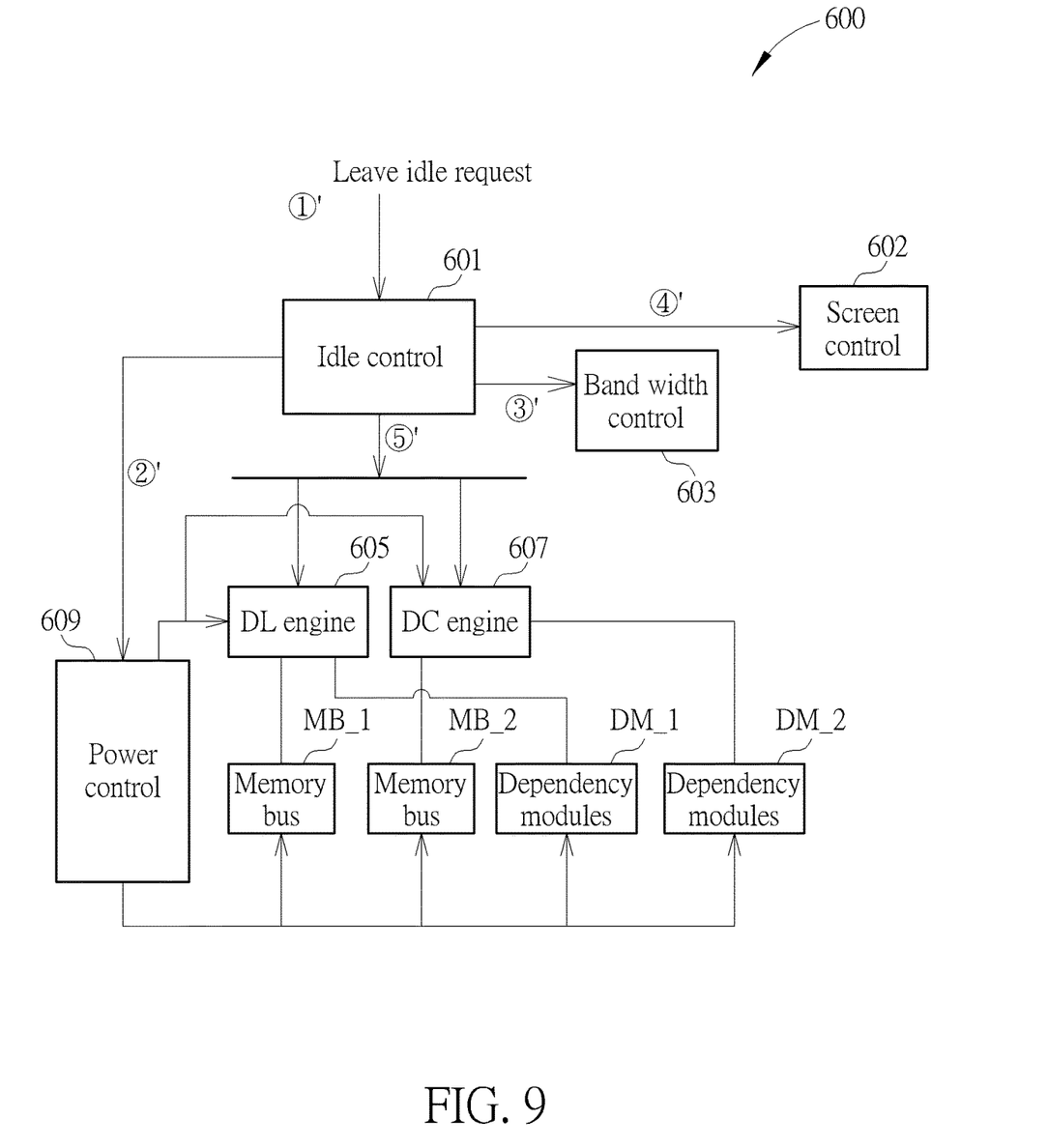
FIG. 9 is a block diagram illustrating the HW control procedure of leaving idle mode.

FIG. 7 and FIG. 9 are block diagrams illustrating different operations of the screen control system illustrated in FIG. 6. In FIG. 7, the screen system 100 is requested to enter the idle mode. Further, in FIG. 9, the screen system 100 is requested to leave the idle mode.

The operations illustrated in FIG. 7 comprises following steps:

Step 1

The idle control circuit 601 receives the idle request and triggers the following hardware operations of idle switch. This step can correspond to the steps 305, 309 in FIG. 3.

The idle request can be generated by software in the host 103. For example, if the host 103 does not receive any new image which is needed to be updated to the screen 101 for a time period, the software generates the idle request.

Step 2

The idle control circuit 601 checks the hardware state machine, and may cancel subsequent steps of entering idle mode if the hardware has received a leave idle request. Otherwise, the idle control circuit 601 determines if the hardware path in the host 103 should be changed, according to the type of the screen 101. In other words, the idle control circuit 601 determines and accomplish the hardware path switch operations according to the type of the screen 101.

Specifically, if the screen is a VDO screen and uses WDMA to generate the idle image, the hardware paths of the host 103 are switched from direct link path to decouple path. That is, no need of overlaying or frame quality processing since the image keeps unchanged until leaving idle mode. Accordingly, all direct link engines can be stopped and even power off, while the decouple engines still keep working to transmit the idle image to VDO screen with a lower frame refresh rate (e.g., the state of frame N+1 in FIG. 4).

Please go back to FIG. 4 and FIG. 5 again. During the time of frames N−1 and N in FIG. 4, the host 103 uses the DL path. While, during the time of the frames N+1 in FIG. 4, the host 103 switched to DC path. So that, idle control circuit 601 will automatically finish the path switch operations of frame N and N+1 in step 2 for VDO screen.

If the screen is a CMD screen, the host 103 does not need to generate any image in the idle mode since the screen 101 already hold the idle image in its buffer, thus all electronic devices in the host 103 can be off for low power performance. In such case, both the set of direct link engines 605 and the set of decouple engines 607 are non-active. So that, idle control circuit 601 will ignore the path switch operation in step 2 for CMD type screen.

Step 3

The idle control circuit 601 checks the hardware state machine, and may cancel subsequent steps of enter idle mode if the hardware has received a leave idle request. Otherwise, the idle control circuit 601 determines if the transfer mode or the frame rate of the screen 101 should be changed or not according to the type of the screen 101. For more detail, the idle control circuit 601 may switch to a low power transfer mode (e.g., ULPS mode) if the screen 101 is a CMD screen, and do frame update with a lower refresh rate if the screen 101 is a VDO screen.

Step 4

The idle control circuit 601 checks the hardware state machine, and may cancel subsequent steps of enter idle mode if the hardware has received a leave idle request. Otherwise, the idle control circuit 601 transmits bandwidth control requests to the bandwidth control circuit 603.

For more detail, the bandwidth control circuit 603 will back up working bandwidth settings, and clear the idle bandwidth to 0 for CMD screen since host stopped working, or update a lower idle bandwidth for VDO screen since host keeps working with a lower frame refresh rate.

Step 5

The idle control circuit 601 checks the hardware state machine, and may cancel subsequent steps of enter idle mode if the hardware has received a leave idle request. Otherwise, the idle control circuit 601 transmits power requests to the power control circuit 609 corresponding to different hardware paths. For the CMD type screen, the idle control circuit 601 can request the power control circuit 609 to perform register backup and power off of the direct link modules 605 and the decouple modules 607, the memory bus interfaces MB_1, MB_2, and the dependency modules DM_1 and DM_2 at the same time; for the VDO type screen, the idle control circuit 601 can request the power control circuit 609 to perform register backup and power off only for the direct link modules 605, the memory bus interface MB_1, and the dependency module DM_1.

In one embodiment, the idle control circuit 601 keeps power on no matter the screen 101 operates in an idle mode or a working mode, when the screen 101 is power on. In other words, the idle control circuit 601 always keeps active until screen off, so that it can immediately handle the SOFTWARE idle requests.

Figure 8:
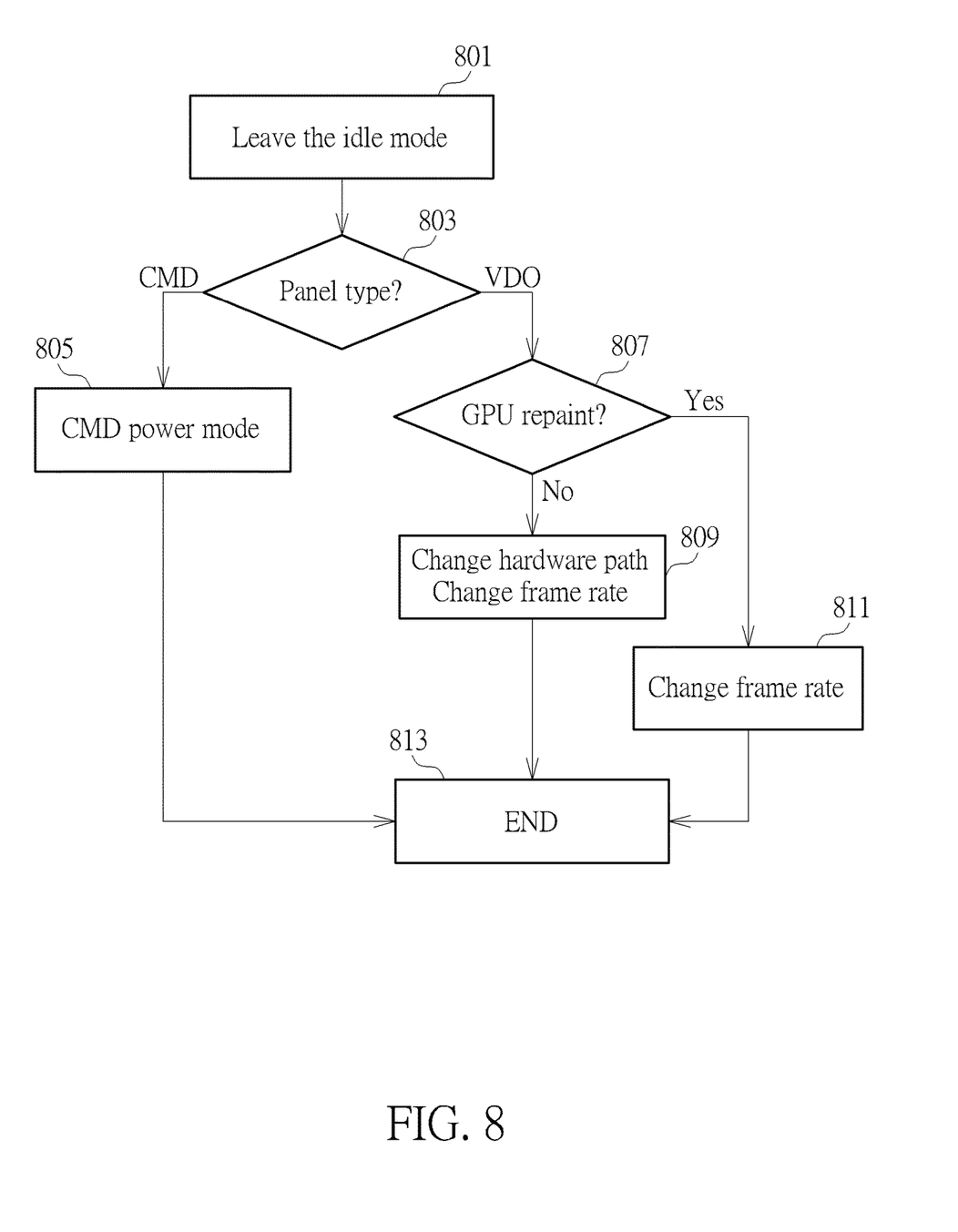
FIG. 8 is a SOFTWARE flow chart illustrating operations for leaving idle mode of the screen system according to one embodiment of the present invention.

FIG. 8 is a SW flow chart illustrating the leaving idle mode operations of the screen control system. FIG. 9 shows the HW procedure of step 805 and 809 in FIG. 8. Please consider both of FIG. 8 and FIG. 9 when try to understand the concepts of the present invention for clarity.

The flow chart illustrating in FIG. 8 comprises following steps:

Step 801

Control the screen system 100 to start to leave the idle mode. In other words, the step 801 includes starting to switch the screen system from idle mode to working mode. Please note, in the step 801, the screen system 100 is in the idle mode. Different examples of step 801 will be described later.

Step 803

Check the screen type of the screen 101.

Go to step 805 if the screen 101 is a CMD screen, or go to step 807 if the screen 101 is a VDO screen.

Step 805

SW send an idle request to the idle control circuit 601, and the idle control circuit 601 will send power request to the power control circuit 609, which will automatically power on and restore the display settings of the set of DL engines and the set of DC engines. More detail operations of CMD screen leaving idle mode will be described in FIG. 9.

Step 807

Check if the idle image is generated by the GPU. Go to step 809 if no (i.e., the idle image is generated by WDMA), and go to step 811 if yes (i.e., the idle image is generated by GPU).

Step 809

SW send an idle request to the idle control circuit 601, and the idle control circuit 601 will send power request to the power control circuit 609, which will automatically power on and restore the display settings of the set of DL engines 605, and switch to DL path, rollback frame rate settings of working mode. More detail operations of VDO screen leaving idle mode will be described in FIG. 9.

Step 811

Rollback the frame rate settings and bandwidth settings of working mode.

Step 813

End. At this time, the screen system has been working mode now.

The operations illustrated in FIG. 9 comprises following steps:

Step 1'

The idle control circuit 601 receives a leave idle request and triggers the following hardware operations of idle switch. This step can correspond to the step 805 and 809 in FIG. 8.

The leave idle request can be generated by software in the host 103. For example, if the host 103 receives or generates a new image which is needed to be updated to the screen 101, the software generates the leave idle request.

Step 2'

The idle control circuit 601 will check current state machine and skip this step if last enter idle procedure didn't start step 5 in FIG. 7.

Else, the idle circuit 601 will transmit power requests to the power control circuit 609 according to the screen type. For video type, DL engines 605, MB1, and DM1 will be power on and restored. For cmd type, DL engines 605, DC engines 607, MB1, MB2, DM1 and DM2 will be power on and restored.

Step 3'

The idle control circuit 601 may check current state machine and skip this step if last enter idle procedure didn't start step 4 in FIG. 7.

Else, the idle circuit 601 will transmit bandwidth request to the bandwidth control circuit 603 and update the bandwidth settings of working mode, including but not limited to the clock frequency and voltage of display engines, memory bus, and memory device.

Step 4'

The idle control circuit 601 may check current state machine and skip this step if last enter idle procedure didn't start step 3 in FIG. 7. Else, the idle control circuit 601 will determine the screen interface operations according to the screen type. For CMD type, the idle control circuit 601 may switch screen interface 602 from low power mode to working mode if necessary. For VDO type, the idle circuit 601 will roll back to a higher frame refresh rate of working mode.

Step 5'

Hardware path switch is an optional step according to the screen type. For CMD mode, the idle control circuit 601 will skip this step. For video mode, the idle control circuit 601 will check current state machine and automatically switch the hardware path from decouple mode to direct link mode and disable WDMA output if last enter idle procedure has started step 2 in FIG. 7.

The speed of the operations illustrated in FIG. 7 and FIG. 9 can be increased since necessary hardware settings of DL engines, DC engines, the memory bus connection paths MB_1, MB_2 and the dependency modules DM_1, DM_2 are automatically back up and restored. Thus the electronic devices in the screen 101 or the host 103 do not need to be manually set one by one while switching between the idle mode and the working mode. Also, in one embodiment, consider the race condition protection of multiple threads, the software in the host 103 is recommended to hold on a mutex lock in the procedure of mode switching. The lock is a well-known synchronization technique. Take FIG. 4 for example, before current patent, the software of host 103 acquires the mutex lock when enable WDMA output at frame N−1, and hold on the mutex lock until disable WDMA output at frame N+1 when enter idle mode. The HW race condition may happened if a new frame arrived before frame N+1, and the leave idle procedure will be blocked until the mutex lock is released after the enter idle procedure is finished. It means that, The UX performance is instable which may take 3 frames delay when leave idle by software method. With current patent, both the enter idle and leave idle procedures are accomplished by hardware automatically. Software just holds on the mutex lock in a very short period when apply the enter idle request to the idle control circuit 601 at the step 305 or step 309 in FIG. 3, or when apply the leave idle request at the step 805 and step 809 in FIG. 8. so that the leave idle procedure cannot be blocked by the enter idle procedure when any race condition happened, and the UX performance can be guaranteed now.

For more detail, software should hold a lock during the hardware configuration period of enter idle or leave idle. The lock period of enter idle before this innovation is more than 2 frames including manually operations of enable WDMA output, wait WDMA output done, and disable WDMA output. The long lock period caused UX delay issue at the race condition of leave idle before the enter idle procedure is accomplished. Based on the innovation of this patent, the UX delay issue cannot happened anymore. Software only hold lock for a very short period to update idle request to idle control circuit 601, which will automatically finish the operations of enable WDMA output, wait WDMA output done, and disable WDMA output. Then, the race condition of leave idle cannot be blocked by the enter idle procedure, while the idle control circuit 601 will immediately leave idle according to the state of enter idle procedure.

Figure 10:
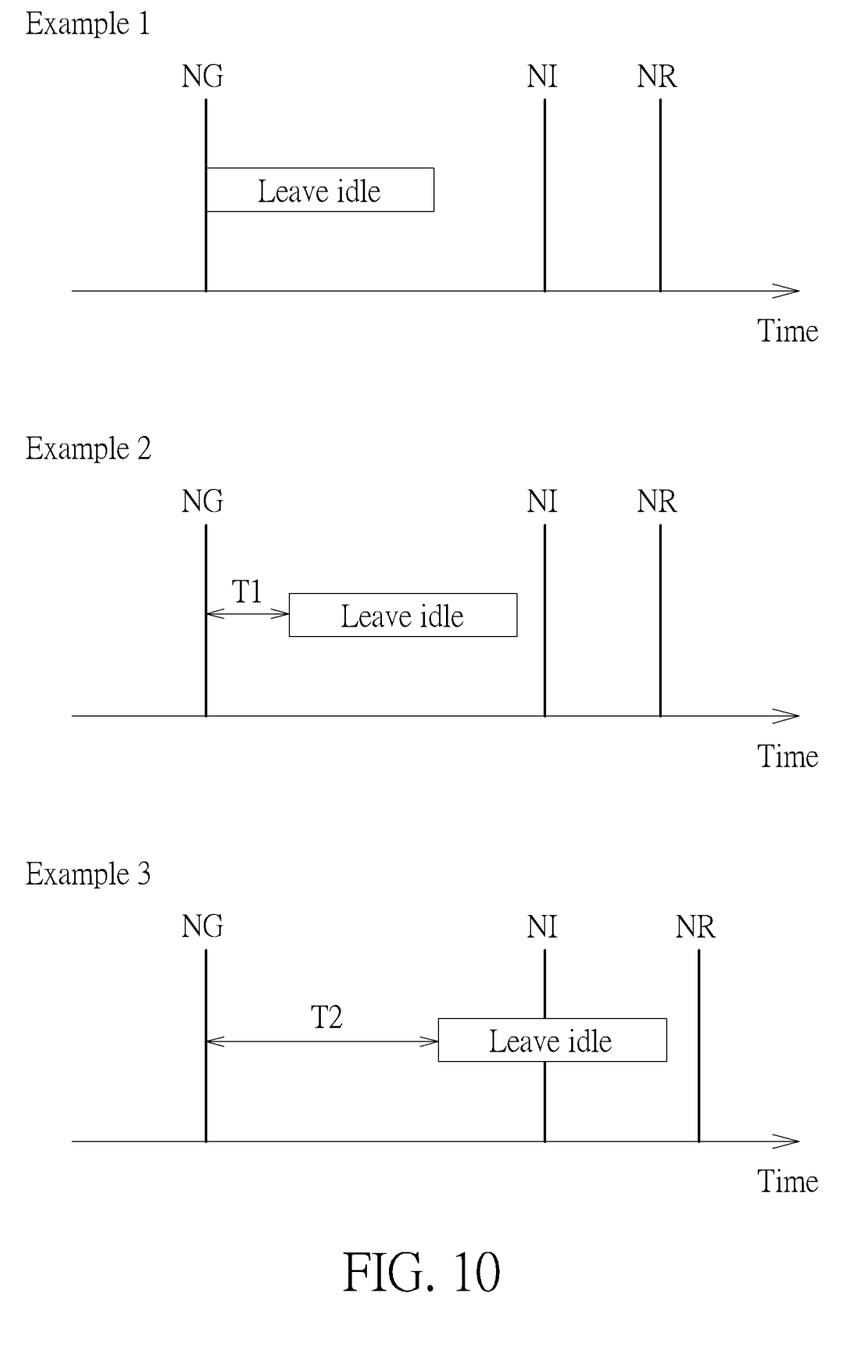
FIG. 10 is a schematic diagram illustrating the step 801 in FIG. 8 according to one embodiment of the present invention.

In one embodiment, the screen system control method further provides a new step of leaving idle mode (e.g., the step 801 in FIG. 8). FIG. 10 is a schematic diagram illustrating step 801 in FIG. 8 according to one embodiment of the present invention. In the embodiment of FIG. 10, the time NG means a time that the APP starts to generate a new image. For example, the user taps the screen 101 thus the APP starts to generate the new image. For another example, the host 103 receives new information from a web page thus the APP starts to generate the new image. Further, the time NI means a time that the host 103 is informed that a new image is arrived. The time NR means that the screen 101 displays the new image.

Conventionally, the operation of leaving idle starts at the time NI. However, as shown in FIG. 10, the operation of leaving idle needs some processing time, thus the user may feel latency if the screen system 100 starts to leave idle at the time NI. Accordingly, in FIG. 10, the software trigger policy of leaving idle procedure can be adjusted corresponding to different UX performance requirements and low power expectation.

In the Example 1 of FIG. 10, the screen system 100 starts to leave the idle mode immediately after the APP starts to generate a new image. The screen system 100 leave idle much earlier than frame update request arrived, which may cause low power performance drop. Also, in the Example 2 of FIG. 10, the screen system 100 starts to leave the idle mode after the time NG for a time period T1. The screen system 100 finished leave idle procedure and switched to working mode just when the frame update request arrived at time NI. T1 is a golden period for the balance between UX performance and low power performance. Further, in the Example 3 of FIG. 10, the screen system 100 starts to leave the idle mode after the time NG for a time period T2 which is too late for the screen system 100 to meet the frame update request time NI, and frame drop happened at the 1st frame after idle mode. Briefly, in the present invention, software of host 103 is recommended to set up a proper adjustment policy of leaving idle point according to the UX performance requirements and low power performance of the screen system.

In view of above-mentioned embodiments, a proper mode switch procedure can be runtime decided by current scenario. Besides, some procedures for screen idle switch can be automatically completed by hardware, thus the delay issue while switching between the idle mode and the working mode can be improved. At the same time, WDMA output solution takes a higher priority than GPU repaint solution, which makes the idle image and normal images generated by the same HW engines as possible as it can be, so that the occurrence of screen flicker issue caused by inconsistent picture quality has been minimized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A screen system control method, applied to a screen system comprising a screen, a host coupled to the screen and an least one idle image generating module, the screen system control method comprising:
    (a) establishing software flow and error handling mechanisms to switch the screen system between working mode and idle mode;
    (b) establishing different mode switch mechanism for different screen types and application scenarios;
    (c) establishing hardware circuit of idle controller and the other display-related engines to automatically accomplish the mode switch operations between working mode and idle mode; and
    (d) establishing an overflow protection mechanism for write direct memory access (WDMA).

2. The screen system control method of claim 1, wherein the step (a) comprises:
    runtime determining the mode switch procedure according to the real time scenario and screen information;
    determining the timing and method of entering and leaving idle mode;
    performing mode switch operations by trigger hardware circuits of the screen system; and
    performing error check and error handlings of the mode switch result reported by hardware circuits.

3. The screen system control method of claim 1, wherein the step (b) comprises:
    determining the timing and method of entering and leaving idle mode according to different scenarios and screen types,
    wherein, when the command (CMD) type screen enters idle mode, all display-related hardware circuits of the host are powered off, and there is no need to monitor anymore frame update requests or data transfer requests in a predetermined period, wherein the CMD type screen has an image buffer to save the idle image, and when the video (VDO) type screen enters idle mode, the screen system generates an idle image by either WDMA or image processing unit (GPU) at the host, which is periodically transferred to the screen, wherein the VDO type screen does not have an image buffer, and once WDMA is applied for the idle image, an appropriate idle switch mechanism is runtime determined according to the layer number, frame refresh rate, and application frame update cycle of current scenario.

4. The screen system control method of claim 1, wherein the host is provided with an idle control circuit and multiple display-related hardware modules, wherein the idle control circuit is a hardware circuit used to accept the mode switch request from software, and automatically trigger the other display-related hardware modules to accomplish the mode switch operations, and the step (c) comprises:
    for CMD screen, by the idle control circuit, automatically backuping the display related register settings, powering off the display related hardware modules, and switching the screen transfer mode into low power state;
    for VDO screen, by the idle control circuit, automatically starting WDMA to output an idle image, switching hardware path, disabling WDMA output function, backuping and powering off unnecessary display related hardware modules in idle mode; and reporting a mode switch result for the software error handling or following software procedure.

5. The screen system control method of claim 4, wherein the display-related hardware modules comprise:
a bandwidth control circuit, coupled to the idle control circuit, configured to adjust the bandwidth ability of the memory system;
a set of direct link engines, are only triggered in the hardware path of direct link mode, and can be power off or inactive in the hardware path of decouple mode, Direct link path is applied in the working mode of CMD screen and VDO screen;
a set of decouple engines, are mandatory triggered in the hardware path of decouple mode, and optional triggered in the hardware path of direct link mode, wherein decouple path is suggested in the idle mode of VDO screen;
a power control circuit, coupled to the idle control circuit, configured to do power control and register backup/restore of the set of direct link engines, the set of decouple engines, and their relative memory bus and dependency modules;
a screen control circuit, coupled to the idle control circuit, configured to update the transfer mode or frame refresh rate of screen;
a memory system, configured to control memory buffer for storing the image on the host side; and
at least one memory connection bus, coupled to the set of direct link engines and the set of decouple engines, comprises hardware circuit of DMA transaction reception or transmission, and even transaction priority management for the set of direct link engines and the set of decouple engines.

6. The screen system control method of claim 4,
when the screen system enters idle mode, the idle control circuit automatically switches hardware path, notifies the power control circuit to perform registers backup and power off the unnecessary display related hardware modules in idle mode, notifies bandwidth control circuit to update idle bandwidth level of idle mode, and notifies screen control circuit to change screen transfer mode or decrease frame refresh rate;
when the screen system leave idle mode, the idle control circuit automatically notifies the bandwidth control circuit to restore the bandwidth level of working mode, notifies the power control circuit to power on and restore the register settings of the display related hardware modules which has been off in idle mode, notifies the screen control circuit to roll back the screen transfer mode or frame refresh rate in working mode, and switches hardware path.

7. The screen system control method of claim 1, wherein the error handling mechanisms in the step (a) comprises:
runtime checking if a memory system in the host has enough resources to support the WDMA to output the idle image;
applying the idle request to the idle control circuit if the memory system has enough resources to support the WDMA;
else, applying GPU repaint request to generate the idle image; and
checking the mode switch result reported by the idle control circuit, disabling WDMA function and applying GPU repaint request to generate the idle image once WDMA output an invalid idle image.

8. The screen system control method of claim 1, wherein the step (d) comprises:

by the hardware circuit of screen system, automatically triggering the WDMA overflow protection mechanism to ensure a correct screen image when WDMA output slowly and blocks the main frame data stream toward the screen; and
by the idle control circuit, providing an error retry mechanism, wherein the WDMA output function keeps working until the overflow error times reached the maximum number allowed by software, then the idle control circuit ends the enter idle procedure and reports an error result to software if retry failed.

9. A screen system comprising:
a host;
a screen, coupled to the host;
at least one idle image generating module; and
a processing circuit, configured to perform following steps:
 (a) establishing software flow and error handling mechanisms to switch the screen system between working mode and idle mode;
 (b) establishing different mode switch mechanism for different screen types and application scenarios;
 (c) establishing hardware circuit of idle controller and the other display-related engines to automatically accomplish the mode switch operations between working mode and idle mode; and
 (d) establishing an overflow protection mechanism for write direct memory access (WDMA).

10. The screen system of claim 9, wherein the step (a) comprises:
runtime determining the mode switch procedure according to the real time scenario and screen information;
determining the timing and method of entering and leaving idle mode;
performing mode switch operations by trigger hardware circuits of the screen system; and
performing error check and error handlings of the mode switch result reported by hardware circuits.

11. The screen system of claim 9, wherein the step (b) comprises:
determining the timing and method of entering and leaving idle mode according to different scenarios and screen types,
wherein, when the command (CMD) type screen enters idle mode, all display-related hardware circuits of the host are powered off, and there is no need to monitor anymore frame update requests or data transfer requests in a predetermined period, wherein the CMD type screen has an image buffer to save the idle image, and when the video (VDO) type screen enters idle mode, the screen system generates an idle image by either WDMA or image processing unit (GPU) at the host, which is periodically transferred to the screen, wherein the VDO type screen does not have an image buffer, and once WDMA is applied for the idle image, an appropriate idle switch mechanism is runtime determined according to the layer number, frame refresh rate, and application frame update cycle of current scenario.

12. The screen system of claim 9, wherein the host is provided with an idle control circuit and multiple display-related hardware modules, wherein the idle control circuit is a hardware circuit used to accept the mode switch request from software, and automatically trigger the other display-related hardware modules to accomplish the mode switch operations, and the step (c) comprises:

for CMD screen, by the idle control circuit, automatically backuping the display related register settings, powering off the display related hardware modules, and switching the screen transfer mode into low power state;

for VDO screen, by the idle control circuit, automatically starting WDMA to output an idle image, switching hardware path, disabling WDMA output function, backuping and powering off unnecessary display related hardware modules in idle mode; and reporting a mode switch result for the software error handling or following software procedure.

13. The screen system of claim 12, wherein the display-related hardware modules comprise:
a bandwidth control circuit, coupled to the idle control circuit, configured to adjust the bandwidth ability of the memory system;
a set of direct link engines, are only triggered in the hardware path of direct link mode, and can be power off or inactive in the hardware path of decouple mode, Direct link path is applied in the working mode of CMD screen and VDO screen;
a set of decouple engines, are mandatory triggered in the hardware path of decouple mode, and optional triggered in the hardware path of direct link mode, wherein decouple path is suggested in the idle mode of VDO screen;
a power control circuit, coupled to the idle control circuit, configured to do power control and register backup/restore of the set of direct link engines, the set of decouple engines, and their relative memory bus and dependency modules;
a screen control circuit, coupled to the idle control circuit, configured to update the transfer mode or frame refresh rate of screen;
a memory system, configured to control memory buffer for storing the image on the host side; and
at least one memory connection bus, coupled to the set of direct link engines and the set of decouple engines, comprises hardware circuit of DMA transaction reception or transmission, and even transaction priority management for the set of direct link engines and the set of decouple engines.

14. The screen system control method of claim 12,
when the screen system enters idle mode, the idle control circuit automatically switches hardware path, notifies the power control circuit to perform registers backup and power off the unnecessary display related hardware modules in idle mode, notifies bandwidth control circuit to update idle bandwidth level of idle mode, and notifies screen control circuit to change screen transfer mode or decrease frame refresh rate;
when the screen system leave idle mode, the idle control circuit automatically notifies the bandwidth control circuit to restore the bandwidth level of working mode, notifies the power control circuit to power on and restore the register settings of the display related hardware modules which has been off in idle mode, notifies the screen control circuit to roll back the screen transfer mode or frame refresh rate in working mode, and switches hardware path.

15. The screen system of claim 9, wherein the error handling mechanisms in the step (a) comprises:
runtime checking if a memory system in the host has enough resources to support the WDMA to output the idle image;
applying the idle request to the idle control circuit if the memory system has enough resources to support the WDMA;
else, applying GPU repaint request to generate the idle image; and
checking the mode switch result reported by the idle control circuit, disabling WDMA function and applying GPU repaint request to generate the idle image once WDMA output an invalid idle image.

16. The screen system control method of claim 9, wherein the step (d) comprises:
by the hardware circuit of screen system, automatically triggering the WDMA overflow protection mechanism to ensure a correct screen image when WDMA output slowly and blocks the main frame data stream toward the screen; and
by the idle control circuit, providing an error retry mechanism, wherein the WDMA output function keeps working until the overflow error times reached the maximum number allowed by software, then the idle control circuit ends the enter idle procedure and reports an error result to software if retry failed.

* * * * *